(12) United States Patent
Nuhn et al.

(10) Patent No.: US 7,159,889 B2
(45) Date of Patent: Jan. 9, 2007

(54) ARTICULATED LIQUID MANURE SPREADER

(75) Inventors: Dennis Nuhn, Sebringville (CA); Ian Nuhn, Sebringville (CA)

(73) Assignee: Nuhn Industries Limited, Sebringville (CA)

( * ) Notice: Subject to any disclaimer, the term of this patent is extended or adjusted under 35 U.S.C. 154(b) by 259 days.

(21) Appl. No.: 10/868,964

(22) Filed: Jun. 17, 2004

(65) Prior Publication Data

US 2005/0061836 A1    Mar. 24, 2005

(51) Int. Cl.
*B62D 12/00*    (2006.01)
*A01C 1/00*    (2006.01)
(52) U.S. Cl. ........................ 280/419; 239/675
(58) Field of Classification Search ................. 280/419, 280/406.1, 411.1; 239/675
See application file for complete search history.

(56) References Cited

U.S. PATENT DOCUMENTS

| | | | | |
|---|---|---|---|---|
| 2,296,909 A | * | 9/1942 | Dake | 239/665 |
| 3,398,662 A | * | 8/1968 | Williamson et al. | 222/627 |
| 4,232,616 A | * | 11/1980 | van der Lely | 111/121 |
| 5,364,116 A | | 11/1994 | Houle et al. | |
| 5,501,404 A | * | 3/1996 | Meyer et al. | 239/676 |
| 5,595,397 A | | 1/1997 | Depault | |
| 5,904,365 A | | 5/1999 | Dillon | |
| 6,099,013 A | * | 8/2000 | Stoss | 280/407 |
| 6,488,114 B1 | | 12/2002 | McMahon et al. | |
| 2001/0007234 A1 | | 7/2001 | Scheetz | |
| 2005/0199754 A1 | * | 9/2005 | Courtemanche | 239/722 |

FOREIGN PATENT DOCUMENTS

| | | |
|---|---|---|
| EP | 0 202 037 B1 | 11/1986 |
| EP | 0 520 575 A1 | 12/1992 |
| GB | 1280284 | 2/1969 |

* cited by examiner

*Primary Examiner*—Tony Winner
(74) *Attorney, Agent, or Firm*—Robert A. H. Brunet; Brunet & Co. Ltd.

(57) ABSTRACT

A liquid manure spreader is described which comprises a frame having a plurality of frame portions and having articulation means between each frame portion for permitting relative movement of each frame portion in response to directional changes of the liquid manure spreader. Such an arrangement facilitates turning of the liquid manure spreader. The liquid manure spreader also comprises two or more liquid manure tanks which are in fluid communication with each other. A pump may be used to re-circulate the liquid manure between the tanks, transfer the liquid manure to a spreader means, or both. Liquid manure can also be transferred between the tanks to thereby achieve a pre-determined weight distribution between the tanks. Such a fluid arrangement permits better weight distribution leading to better handling of the manure spreader.

18 Claims, 8 Drawing Sheets

ARTICULATED LIQUID MANURE SPREADER

FIELD OF THE INVENTION

The invention relates to farm implements for transporting liquid manure and for applying liquid manure to fields. More particularly, the invention relates to a liquid manure spreader that is articulated to permit the spreader to readily turn.

BACKGROUND OF THE INVENTION

Liquid manure spreaders are used in the transportation of liquid manure and in the application of liquid manure to fields. Liquid manure is generally comprised of a slurry of liquid and solid animal waste produced from animal husbandry farming operations. A liquid manure spreader typically comprises a tank mounted upon a frame having one or more axles and having hitch means for attachment to the drawbar of a towing vehicle, typically a farm tractor. Due to the increasing size of farming operations, there has been a trend in the industry towards large capacity liquid manure spreaders that can handle, for example, in excess of 8000 gallons, more typically 10,000 gallons. These large capacity liquid manure spreaders are quite heavy and create significant soil compaction. In addition, recent road weight allowance limits enacted in legislation have mandated a maximum weight per axle within a certain prescribed distance. These factors have caused manufacturers of large capacity liquid manure spreaders to increase the number of axles, typically to three or four axles for very large capacity units.

In order to accommodate the large capacity tank and the increased number of axles, large capacity manure spreaders also have a long length. Since the axles are typically spaced apart along the length of the spreader, the long length makes the spreaders difficult to turn. It is desirable that the spreader is able to turn within a short turning radius. In response to this difficulty, manufacturers of large capacity spreaders have adopted steering systems that permit the rear axle or front and rear axles to turn in response to a change of direction of the towing vehicle. U.S. Pat. Nos. 5,364,116 and 5,595,397 provide examples of such systems. However, these systems are complicated, expensive, and difficult to maintain in the highly corrosive and dirty environment in which liquid manure spreaders are used.

The distribution of weight on to the drawbar of the towing vehicle is also an important factor in maneuvering the spreader. When turning, the contents of the tank move opposite to the direction in which the spreader is turned, making it difficult to steer the spreader. Also, due to the overall weight of a large-capacity spreader, the spreader tends to travel in a straight line during a turn, pushing the rear of the towing vehicle during a turn; this problem is exacerbated with insufficient weight transfer to the drawbar of the towing vehicle. The contents of the tank tend to slosh during transport, causing a jarring movement of the spreader and the towing vehicle due to oscillatory weight distribution. When travelling uphill, the contents of the tank tend to move towards the rear of the spreader, decreasing the weight distribution on to the drawbar and reducing the traction of the towing vehicle. This makes it difficult to pull the spreader uphill, a problem exacerbated by the overall weight of a large capacity spreader. EP 0 202 037, filed by Brian Lund on Apr. 21, 1986 and granted Jul. 2, 1990, attempts to address this problem in a smaller spreader by partitioning the tank and draining first the rear partition, then the front partition. A system is provided for transferring the contents of the front partition to the rear by means of air pressure. However, this system is complicated, expensive and not particularly well suited to large capacity spreaders.

In order to mitigate the tendency of the spreader to tip during turning, it is desirable to maintain a low center of gravity. In the prior art, the complicated steering systems raise the overall height of the spreader, necessitating the use of an oblate or T-shaped tank to provide clearance for the steering system while lowering the center of gravity of the spreader. However, when travelling along the side of a hill perpendicular to the slope of the hill, the center of gravity of a T-shaped tank moves significantly upwardly and to one side, exacerbating the pre-existing susceptibility to tipping of these spreaders. In addition, these types of tanks are expensive to construct and it is difficult for the farmer to predict the volume of material remaining in the tank as the contents are being spread, due to the non-uniform relationship between the liquid level in the tank and the volume of the tank.

The need therefore still exists for an improved large capacity liquid manure spreader.

SUMMARY OF THE INVENTION

There is provided a liquid manure spreader comprising: a frame having a front end and a rear end, the front end having hitch means for connection to a towing vehicle, the rear end having spreader means for spreading liquid manure; two or more spaced apart tanks, each tank mounted on to a respective frame portion of the frame, the tanks in fluid communication with one another through one or more fluid conduits; a set of axles mounted beneath each frame portion having wheels mounted thereto on opposite sides of the frame; and, the frame having articulation means located between each frame portion permitting relative movement of each frame portion in response to directional changes of the liquid manure spreader.

There is further provided a liquid manure spreader comprising: a frame having a front end and a rear end, the front end having hitch means for connection to a towing vehicle, the rear end having spreader means for spreading liquid manure; two or more spaced apart tanks mounted to the frame and in fluid communication with one another through one or more fluid conduits; at least two sets of axles mounted beneath the frame having wheels mounted thereto on opposite sides of the frame; and, one or more pumps in fluid communication with one or more fluid conduits for transferring liquid manure from one tank to another of the tanks.

There is yet further provided a system for spreading liquid manure comprising: a liquid manure spreader comprising: a frame having a front end and a rear end, the front end having hitch means for connection to a towing vehicle, the rear end having spreader means for spreading liquid manure; two or more spaced apart tanks mounted to the frame and in fluid communication with one another through one or more fluid conduits; at least two sets of axles mounted beneath the frame having wheels mounted thereto on opposite sides of the frame; one or more pumps in fluid communication with the one or more fluid conduits; and, selectively transferring liquid manure from a certain tank to achieve a pre-determined weight distribution between the tanks.

The liquid manure spreader of the present invention is advantageously designed to improve steering and handling as compared with prior art spreaders.

To facilitate turning and handling of the liquid manure spreader, an articulation means is provided between each frame portion. Any suitable articulation means may be employed. The articulation means has a vertical pivot axis passing therethrough that permits relative pivoting movement of each frame portion about the vertical axis. The articulation means preferably permits adjacent frame portions to pivot in opposite directions about the vertical pivot axis in response to directional changes of the liquid manure spreader. The articulation means may comprise, for example: a pintle hitch, a ball and socket, an eye and pin arrangement, or any other suitable means. The articulation means allows a large-capacity spreader to be built without a complicated steering system while advantageously allowing turning of the spreader within a short turning radius.

To further improve handling of the liquid manure spreader, it is desirable that the articulation means fits together snugly without excessive tolerance about the vertical pivot axis, thereby limiting movement of the vertical pivot axis relative to the frame. This advantageously reduces the propensity for undesirable jarring movement between the frame portions when braking or turning due to sloshing of liquid manure within the tanks. For this reason, a conventional eye and pin arrangement having tolerances permitting easy removal of the pin, as is common amongst many agricultural implements, is less desirable as an articulation means than other embodiments that fit more snugly, such as a pintle hitch. Although the articulation means may permit the frame portions to be separated, the spreader is not designed for ready separation of the frame portions and is meant to function as a single integrated unit.

Weight distribution of fluid in the tanks is another important consideration for improving handling of the spreader by the towing vehicle. During a turn, the weight of liquid in the front and rear tanks shifts in opposite directions due to the pivoting of the frame about the articulation means; this advantageously mitigates the tendency of the spreader to push the rear of the towing vehicle during a turn. To further mitigate this tendency and improve handling, the liquid manure spreader of the present invention is designed to transfer weight forward onto the towing vehicle via the hitch means.

Weight transfer occurs in part due to the placement of the axle or axles beneath each frame portion. The axle or axles are preferably mounted rearward of the center of their respective frame portion by a distance, the distance increasing for each successive frame portion from the front of the spreader. For example, in one embodiment, the spreader comprises front and rear tanks mounted on front and rear frame portions, respectively. Preferably, the center of each tank is mounted to its respective frame portion forward of the center of the set of axles so that a portion of the weight of the tank is transferred forward on the frame portion. A first set of axles is mounted beneath the front frame portion rearward of the center of the front tank by a first distance and a second set of axles is mounted beneath the rear frame portion rearward of the center of the rear tank by a second distance. The first distance is greater than the second distance so that weight is transferred from the rear frame portion to the front frame portion and thence from the front frame portion to the towing vehicle. The first distance may be, for example, between 20 and 36 inches, preferably about 26 inches and the second distance may be, for example, between 14 and 26 inches, preferably about 20 inches.

To yet further improve handling, the spreader is designed with a low center of gravity. Each tank is mounted to its respective frame portion with a lower part of the tank below the top of the frame portion. For example, the frame portion may form a cradle between adjacent longitudinal members of the frame portion and a chordal section of the tank may sit within the cradle, thereby lowering the tank relative to the frame portion. Since the need for a steering system is obviated in the present invention, the tank can occupy space within and below the frame portion down as low as the axles, thereby lowering the center of gravity of the spreader. The tank can therefore be placed immediately adjacent the axles with no intervening structure (other than the cradle). A low center of gravity advantageously makes the spreader less prone to roll-over as a result of directional changes and improves the overall handling of the spreader.

A liquid manure spreader of the present invention comprises a frame having a plurality of frame portions to which a plurality of spaced apart liquid manure tanks are mounted, preferably one tank per frame portion. In one embodiment, the frame comprises two frame portions, two spaced apart tanks and one articulation means between the frame portions. A set of axles is mounted beneath each frame portion, each axle having a wheel or wheels mounted thereto to facilitate traveling of the frame portion. The axles need not necessarily span the width of the frame; a pair of stub axles may be mounted on opposite sides of the frame at the same longitudinal position to function in the same manner as a single axle spanning the width of the frame. A set of axles may comprise any number of axles; for example, one, two, or three axles. without affecting the way the invention works Preferably, two axles are used for each frame portion in a tandem axle arrangement. Any suitable vehicle may be used to tow the manure spreader, for example, a tractor, a truck, etc. In one embodiment, the towing vehicle is a tractor and the hitch means on the frame of the spreader is adapted for connection to the drawbar of the tractor. Placing axles under each frame portion allows the axles to be spaced apart along the length of the frame, advantageously distributing the total weight of the spreader over a relatively long length in compliance with road weight allowance laws that limit weight per axle within a certain prescribed distance. This also advantageously makes the spreader more stable with respect to longitudinal shifting of the weight distribution, for example, when travelling uphill.

At the rear end of the frame, a spreader means is located for spreading liquid manure. Liquid manure may be broadcast on to a field or may be incorporated into the soil. An injector teeth system may be used to increase the efficiency of incorporating the liquid manure into the soil. The spreader means receives liquid manure from the fluid outlet of a tank. The liquid manure may be spread under the force of gravity, although it is preferable to use a spreader pump to provide more even spreading of the manure. A separate spreader pump and fluid outlet may be used for each tank, or there may be only one spreader pump with liquid manure being transferred from one tank to the other as required. While the spreader means is located at the rear end of the frame, the fluid outlet of the tank and the spreader pump may be located in any convenient location on the frame. For example, it may be convenient to have the fluid outlet at the front of the tank and to mount the spreader pump at the front of the frame to facilitate connection of the spreader pump to a Power Take-Off (PTO) shaft of a towing tractor. A fluid conduit may then be provided along the length of the spreader connecting the spreader pump at the front of the spreader to the spreader means at the rear of the spreader.

The tanks of the liquid manure spreader may be any suitable tank for holding liquid manure. The tanks may be of any suitable cross-sectional shape, for example, circular, elliptical, triangular, T-shaped, etc. The tanks may be provided with baffles to reduce sloshing of liquid manure within the tanks and/or with compartments to reduce the quantity of liquid manure that may be lost during a spill. The fluid capacity of each tank may be any suitable value and may be the same as or different from tank to tank. In one embodiment, the fluid capacity is between 3,000 and 8,000 U.S. gallons. In a preferred embodiment, the tanks are similar in fluid capacity and/or cross-sectional shape. In another preferred embodiment, the tanks have a circular cross-section. When travelling along the side of a hill perpendicular to the slope of the hill, the center of gravity of a tank having a circular cross-section moves only slightly as compared with a T-shaped tank, mitigating the tendency of the spreader to tip.

At least one of the tanks comprises a fluid inlet for receiving a load of liquid manure. The fluid inlet may be located in any convenient position, preferably on the top of the tank to facilitate overhead filling of the tank. The fluid inlet may include a splash guard to prevent inadvertent splashing of liquid manure from the tank during filling or during transport. At least one of the tanks comprises a fluid outlet through which liquid manure may pass to the spreader means. The fluid outlet may be located in any convenient position, preferably near the bottom of the tank to facilitate emptying of the tank. The tanks may include an air vent to allow ingress or egress of air during emptying or filling of the tanks. The tanks are preferably in fluid communication with one another so that liquid manure admitted into or withdrawn from any of the tanks may be permitted to flow into or from the other tanks.

Fluid communication may be achieved by any suitable means, for example a conduit or conduits connecting adjacent tanks. The fluid conduits may be rigid or flexible and may include a flexible portion between the spaced apart tanks to permit relative movement of the tanks. In one embodiment, there are two fluid conduits connecting each adjacent tank. A fluid conduit may be provided for transferring liquid manure between the tanks, for example, in response to emptying or filling of one or more tanks. The flow of liquid manure between the tanks may be caused by level differences between the tanks. Another fluid conduit may be provided for re-circulating liquid manure between tanks. Liquid manure may be re-circulated between adjacent tanks to promote mixing, thereby increasing homogeneity of the liquid manure being applied to a field and to reduce manure build-up and deposit in the tanks. The flow of liquid manure between tanks may be aided by one or more pumps. For example, a spreader pump may be used to empty one or more tanks, thereby creating a level difference and a corresponding flow between tanks, and may also be used to re-circulate a portion of the liquid manure being pumped.

The present invention may also include means to control weight distribution of the spreader in order to achieve a pre-determined weight distribution. The pre-determined weight distribution may be based on the total weight of the liquid manure spreader, the angle of the spreader with respect to the horizontal, the available traction of the towing vehicle, or a combination thereof. One skilled in the art can readily determine the criteria needed for effective weight distribution. The means to control weight distribution may comprise selectively transferring liquid manure from a certain tank through one or more fluid conduits, for example by pumping. Pumping may be controlled directly by the operator of the spreader, or may be automatically controlled. In either case, pumping may be effected in response to pre-determined criteria which are initially set by the operator. Fluid flow through each conduit may be fixed or variable and may be controlled synchronously or independently. Pumping may be provided by one or more spreader pumps, and valves may be utilized to direct the fluid appropriately. The liquid manure may be selectively transferred to another of the tanks to achieve the pre-determined weight distribution, or may be spread directly on the field. One or more transfer pumps in fluid communication with one or more fluid conduits may be used to transfer manure to or from a desired tank. Transfer pumps facilitate a variety of control options, as each transfer pump may be selectively controlled to selectively pump fluid from one tank to another in order to achieve a pre-determined weight distribution between tanks.

BRIEF DESCRIPTION OF THE DRAWINGS

In order that the invention may be more clearly understood, preferred embodiments thereof will now be described in detail by way of example, with reference to the accompanying drawings, in which.

DETAILED DESCRIPTION OF THE DRAWINGS

Figure 1:
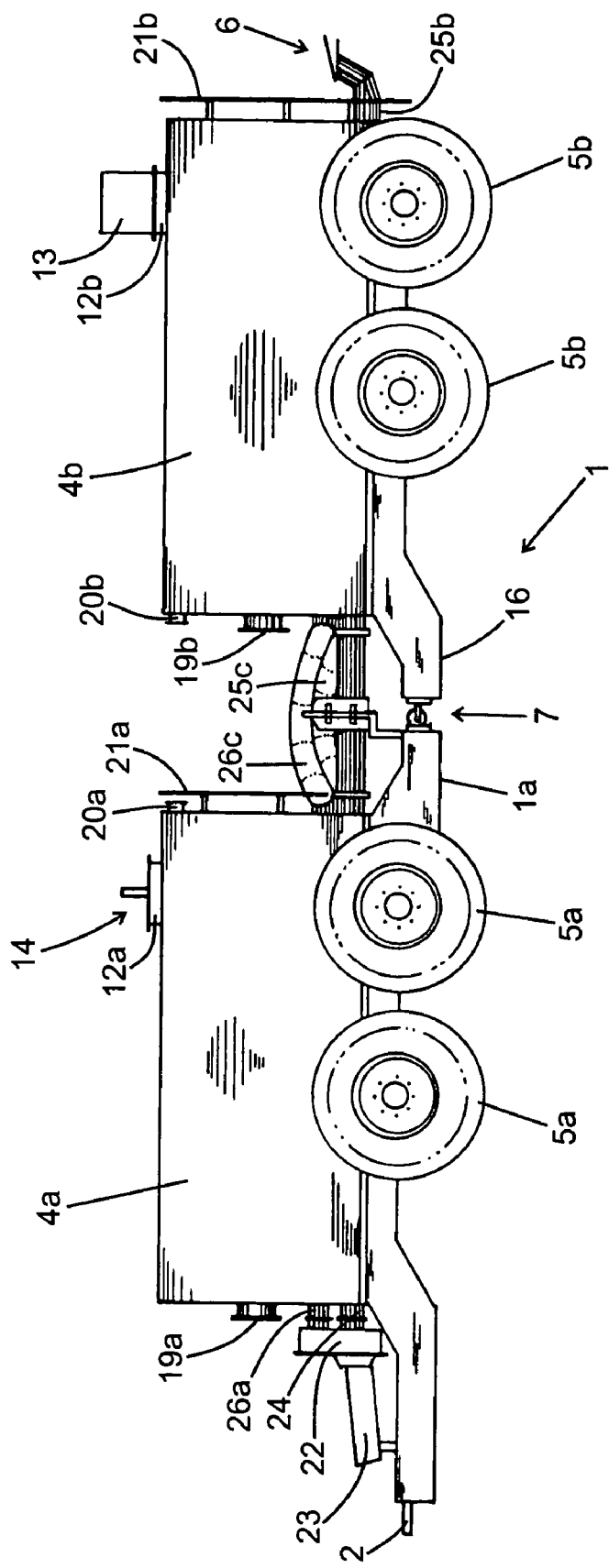
FIG. 1 is a left side view of an embodiment of a liquid manure spreader of the present invention.
Figure 2:
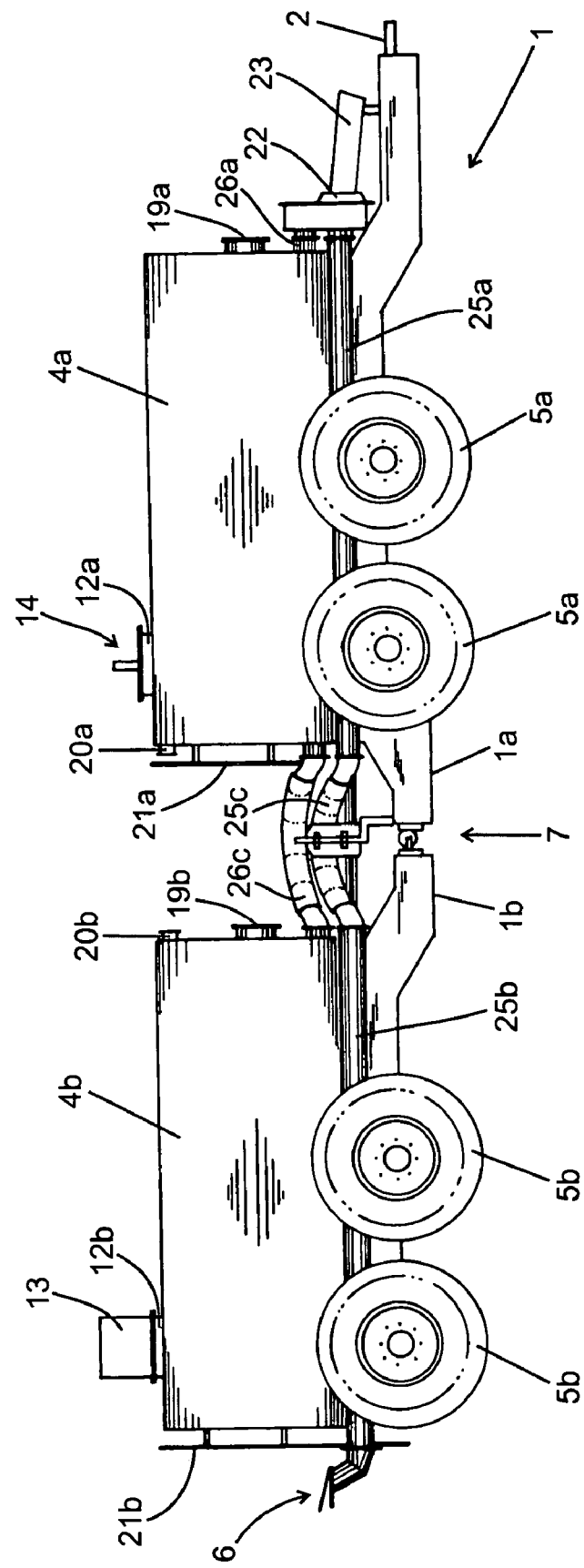
FIG. 2 is a right side view of the liquid manure spreader of FIG. 1.

Referring to FIGS. 1 and 2, a liquid manure spreader of the present invention is depicted. The liquid manure spreader comprises a frame 1 having a hitch means 2 at the front end of the frame 1, the hitch means 2 having a conventional eye and pin arrangement for connection to the drawbar of a tractor (not shown). The frame 1 has a spreader means 6 at the rear end of the frame 1. The frame 1 comprises a front frame portion 1a and a rear frame portion 1b with an articulation means 7 between the frame portions. The front frame portion 1a is built substantially heavier than the rear frame portion 1b to provide sufficient strength to prevent damage to the frame 1 during operation. The front frame portion 1a has a front liquid manure tank 4a mounted thereon and two axles in a tandem axle arrangement mounted thereto beneath the front liquid manure tank 4a. Each axle has a wheel 5a mounted thereto at each end thereof on opposite sides of the frame. Likewise, the rear frame portion 1b has a rear liquid manure tank 4b mounted thereon and two axles in a tandem axle arrangement mounted thereto beneath the rear liquid manure tank 4b. Each axle has a wheel 5b mounted thereto at each end thereof on opposite sides of the frame. The tanks 4a, 4b have a circular cross-sectional shape and have about the same fluid capacity.

Each tank is equipped with a manway 19a, 19b at the front thereof to permit access to the interior of the tank, for example during cleaning, and with a ladder 21a, 21b at the rear thereof to provide access to the top of the tank. A front flanged port 20a is provided on the rear of the front tank 4a and a corresponding rear flanged port 20b is provided on the front of the rear tank 4b facing the front flanged port 20a. The flanged ports 20a, 20b are available for fluid interconnection of the tanks (for example, for connecting the headspace of each tank). Each tank 4a, 4b is provided with an opening at the top thereof surrounded by a riser 12a, 12b. The opening of the rear tank 4b is used for overhead filling of the spreader and is equipped with a splash guard 13 mounted to the rear riser 12b to prevent inadvertent splashing of liquid manure during filling. The opening of the front tank 4a is equipped with an air vent 14 mounted to the front riser 12a to permit egress of air during filling and ingress of air during emptying of the spreader. The air vent 14 is designed to prevent inadvertent loss of liquid manure due to sloshing during transport and is shown in greater detail in FIG. 3.

Figure 3:
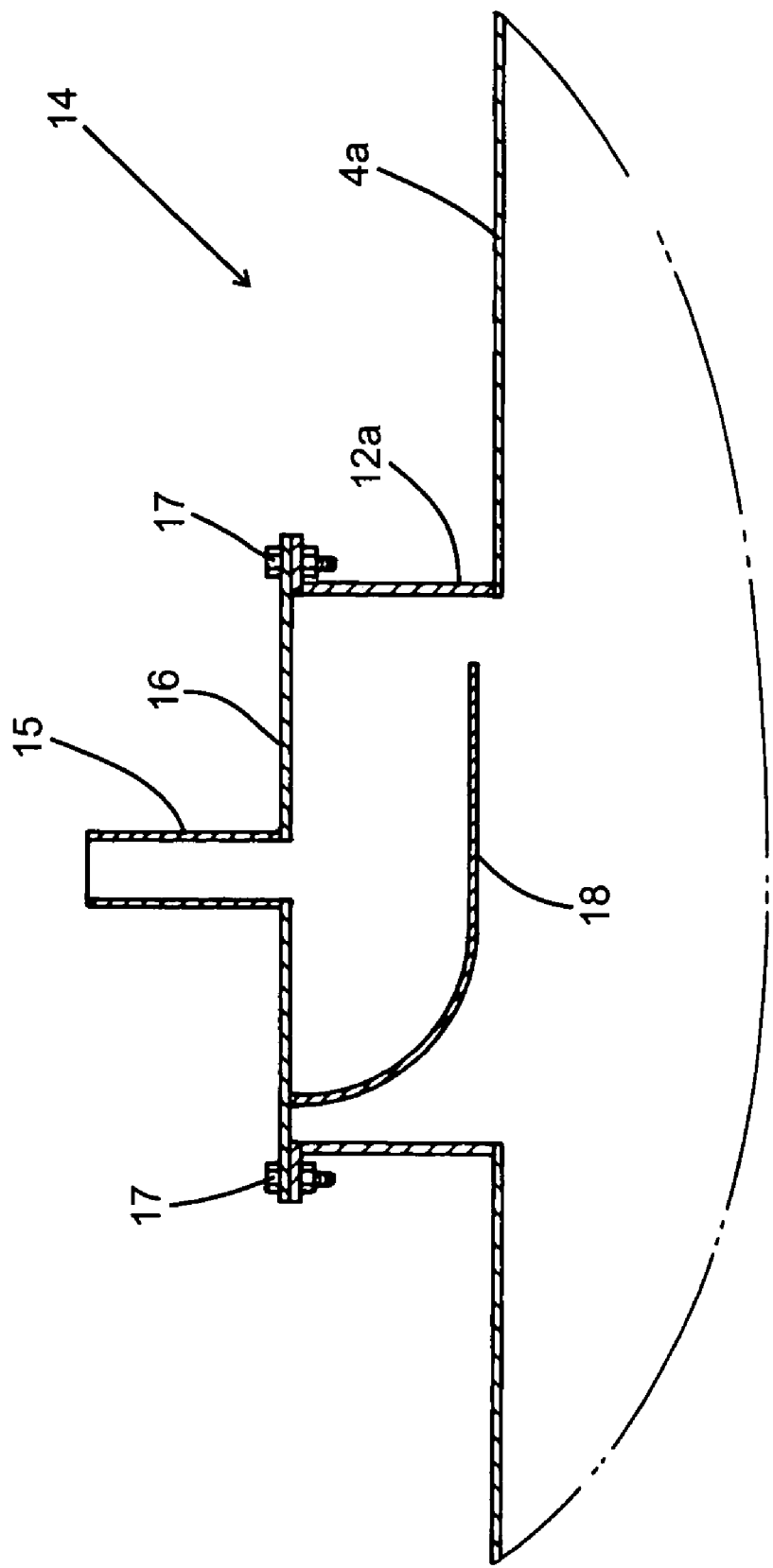
FIG. 3 is a side view of an air vent for use on the liquid manure spreader of FIG. 1.

Referring to FIG. 3, the air vent 14 comprises a standpipe 15 mounted to the top of a vent flange 16 removably attached to the top of the front riser 12a by fasteners 17. A slosh plate 18 is attached to the bottom of the vent flange 16 and sized to fit within the front riser 12a. The slosh plate 18 extends beneath the standpipe 15 and acts as a baffle to prevent inadvertent sloshing of liquid manure from the front tank 4a up through the standpipe 15 during transport. The air vent 14 permits air to pass through the standpipe 15 and past the slosh plate 18 during filling or emptying of the spreader.

Returning to FIGS. 1 and 2, a spreader pump 22 is provided at the front of the frame 1. The spreader pump 22 is powered by a PTO shaft concealed behind shaft guard 23 for connection to the towing tractor (not shown). The inlet of the spreader pump 22 is in fluid communication with the front tank 4a through inlet conduit 24. The outlet of the spreader pump 22 is in fluid communication with an outlet conduit and a re-circulation conduit. The outlet conduit is divided into three connected parts: front outlet conduit 25a, rear outlet conduit 25b, and intermediate outlet conduit 25c. Similarly, the re-circulation conduit is divided into three connected parts: front re-circulation conduit 26a, rear re-circulation conduit 26b, and intermediate re-circulation conduit 26c.

Figure 4:
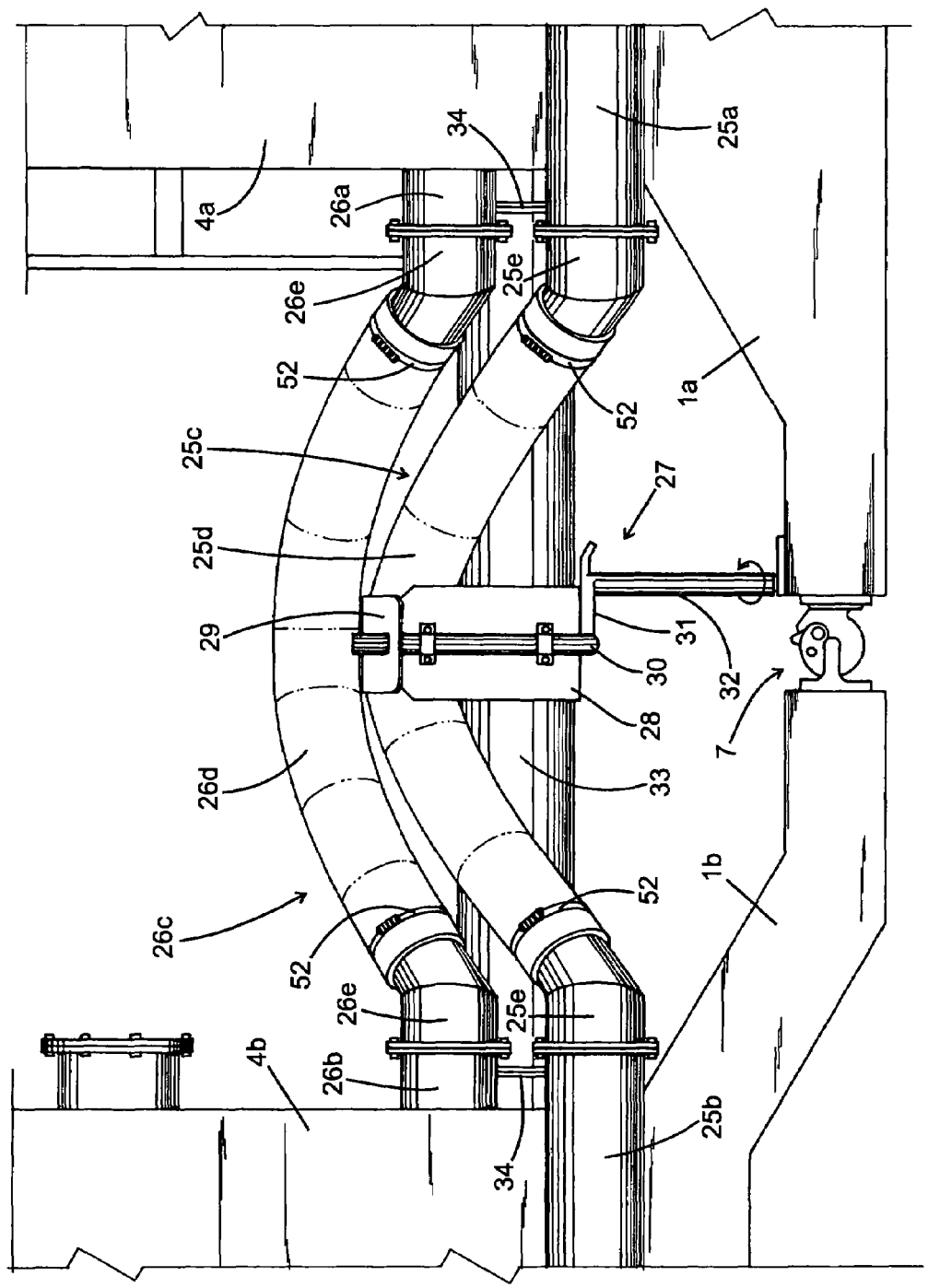
FIG. 4 is an enlargement of FIG. 2, showing the fluid conduits.

Referring to FIG. 4, the parts of the outlet conduit 25a, 25b, 25c and the re-circulation conduit 26a, 26b, 26c are connected by means of flange connectors 51 bolted together with gaskets therebetween in a manner as is conventionally known. The intermediate conduits 25c, 26c each include a flexible portion 25d, 26d made from a hose material that is connected at either end to nipple portions 25e, 26e and held thereon by means of hose clamps 52. The flexible portions 25d, 26d move as the front frame portion 1a and rear frame portion 1b pivot about the articulation means 7. The flexible portions 25d, 26d are supported by a conduit support 27 comprising a U-shaped flexible cradle 28, a flexible retainer 29, a U-shaped support cradle 30, an offset member 31 and a vertical extension 32. The vertical extension 32 is pivotally mounted to the rear of the front frame portion 1a. The offset member 31 is attached to the center of the U-shaped support cradle 30. The flexible cradle 28 is attached to the support cradle 30 and is in non-chaffing contact with the flexible portion 25d of the outlet conduit and with transition conduit 33. The transition conduit 33 is also made from a flexible material and provides fluid communication between the front and rear tanks 4a, 4b by permitting a flow of liquid manure during filling and emptying of the tanks in response to level differences between the tanks. The transition conduit 33 is connected to each tank by means of a rotary flange connector 34 that permits rotational movement of the transition conduit in response to torsional movement of the frame 1, for example during travel of the spreader over rough ground. The retainer 29 is placed on the support cradle 30 between the outlet conduit 25d and the re-circulation conduit 26d to prevent chaffing of the conduits during steering of the spreader. The conduits 25d, 26d, 33 move in response to steering of the spreader and act upon the flexible cradle, causing the vertical extension member to pivot about its axis. The front frame portion 1a is thereby able to move relative to the rear frame portion 1b about the articulation means 7 without kinking, binding, or chaffing of the conduits 25d, 26d, 33.

The front and rear re-circulation conduits 26a, 26b are located inside the front and rear tanks 4a, 4b, respectively. Liquid manure flows rearwardly from the spreader pump along the length of the re-circulation conduit. The re-circulation conduit 26a, 26b comprises apertures (not shown) for admitting a flow of liquid manure into the tanks 4a, 4b to cause mixing and agitation of the contents of the tanks. This prevents a build-up of solid material in the tanks and allows a more uniform consistency of liquid manure to be spread. The outlet conduit 25a, 25b, 25c passes along the length of the spreader and is mounted to the frame outside of the tanks. Liquid manure flows rearwardly form the spreader pump 22 (not shown in FIG. 4) along the length of the outlet conduit and is ultimately spread on to the field using the spreader means 6 (not shown in FIG. 4).

Figure 5:
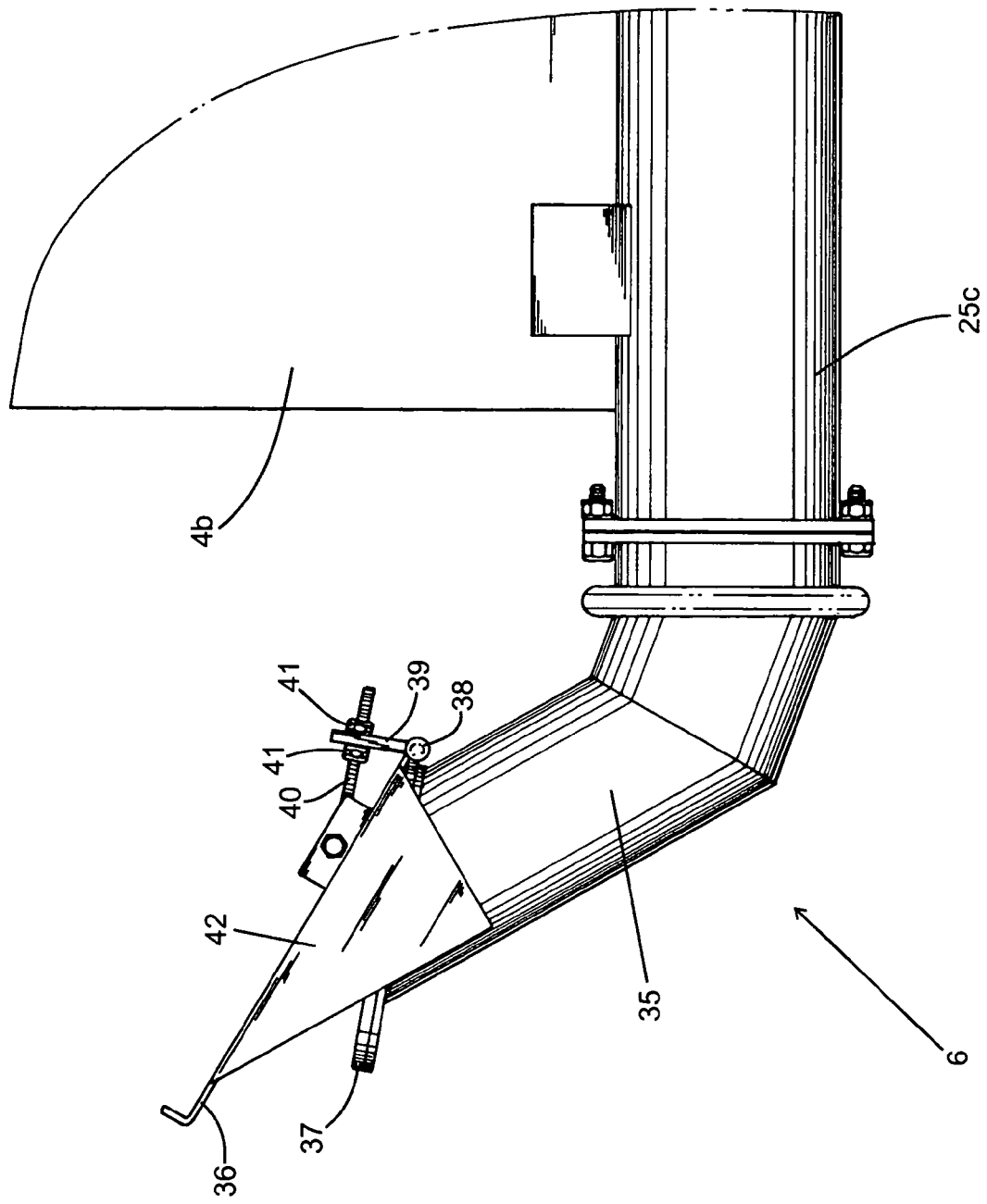
FIG. 5 is an enlargement of FIG. 2, showing the spreader means.

Referring to FIG. 5, the spreader means 6 is located at the rear of the spreader adjacent the rear tank 4b and is connected to the rear outlet conduit 25c by means of a flange as is conventionally known. The spreader means comprises an upwardly angled pipe 35 having an upwardly oriented outlet opening. A trapezoidal spreader plate 36 is attached along its narrow edge to an outlet flange 37 by means of a hinge 38. A stanchion 39 is fixedly attached at a right angle to the outlet flange 38. The stanchion includes an aperture at the top thereof for receiving a threaded rod 40. The threaded rod 40 is pivotally attached to the top of the spreader plate 36. Upon movement of set nuts 41 along the length of the threaded rod 40, the threaded rod moves relative to the stanchion 39 through the aperture, thereby varying the angle between the spreader plate 36 and the outlet flange 37. The angle of the spreader plate determines the spread pattern with which liquid manure is applied to the field, and the angle may be adjusted by the operator of the spreader according to parameters known to those skilled in the art. The spreader plate 36 includes side deflectors 42 attached to the side thereof at an oblique downward angle thereto to help prevent manure from spreading in a sideways direction and to help channel the flow of liquid manure rearward of the spreader.

Figure 6:
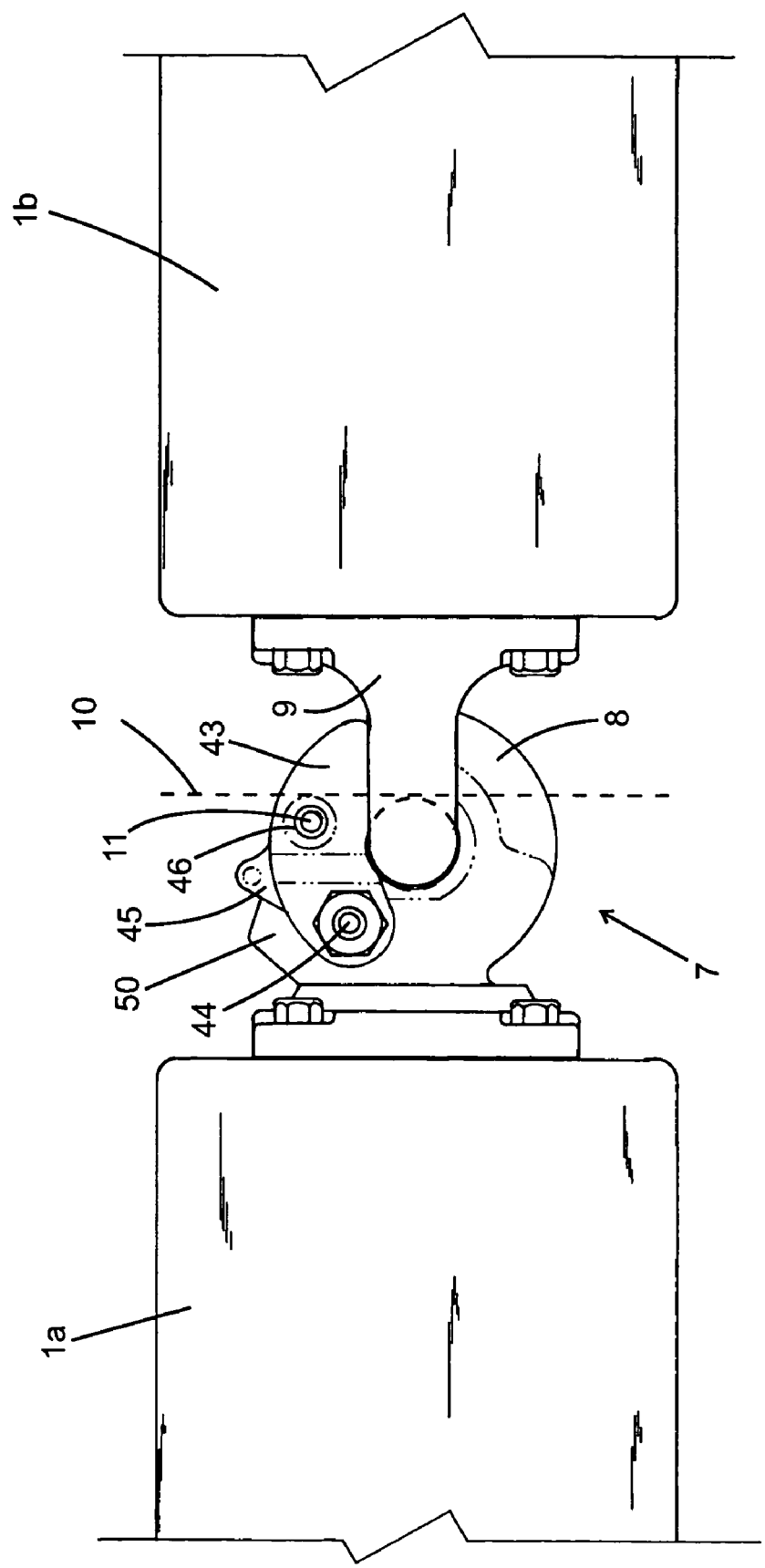
FIG. 6 is an enlargement of FIG. 1, showing the articulation means.

Turning to FIG. 6, the articulation means 7 is a pintle hitch located between the front frame portion 1a and the rear frame portion 1b that permits relative movement between the front and rear frame portions 1a, 1b. The pintle hitch comprises a pintle hook 8 mounted at the rear of the front frame portion 1a and a lunette eye 9 mounted at the front of the rear frame portion 1b. The pintle hook 8 comprises a boss 50 and a clasp 43 pivotally attached to the pintle hook 8 by pintle bolt 44. The clasp 43 has a passage through the center thereof through which a clasp wedge 45 (only partially shown) is received. The clasp wedge 45 is also pivotally attached to the pintle bolt 44 and can pivot relative to the clasp 43 within the passage. The clasp wedge 45 includes an aperture (not shown) that is aligned with clasp aperture 46 in clasp 43. A locking pin 11 is inserted through the aligned apertures to lock the wedge 45 in position relative to the clasp 43. This prevents pivoting of the clasp 43 about the bolt 44 by engagement of the wedge 45 with the boss 50, thereby locking the clasp 43 in the closed position, as shown. The lunette eye 9 is mounted such that the eye aperture faces up and down. The pintle hook 8 is looped through the lunette eye 9 and securely engaged therewithin by means of the locked clasp 43. Once assembled, the pintle hook 8 cannot readily be removed from the lunette eye 9 without upward movement of the eye, for example by jacks or hoists applied to the rear frame portion 1*b*; for this reason, the front frame portion 1*a* and rear frame portion 1*b* are not normally separated from one another. The pintle hitch permits pivoting movement of the front and rear frame portions 1*a*, 1*b* about a vertical pivot axis, shown schematically as 10, aligned with the interface between the lunette eye 9 and the pintle hook 8. Since the pintle hook 8 and lunette eye 9 fit snugly with one another without excessive tolerance, the vertical pivot axis 10 cannot translationally move relative to the frame. This prevents jarring movement of the front and rear frame portions 1*a*, 1*b* relative to one another due to sloshing of their liquid contents during transport. The pintle hitch also permits the spreader to travel over uneven ground, such as a rut in the field, without causing undue stress on the frame by allowing the frame portions to move relative to one another, for example, by permitting the pintle hook to slide about its circumference through the lunette eye and by permitting the pintle hook to rock within the lunette eye in response to torsional stress on the frame. To further reduce torsional stress on the frame while travelling over uneven ground, the pintle hook and lunette eye may be mounted to their respective frame portions by means of a swivel.

Figure 7:
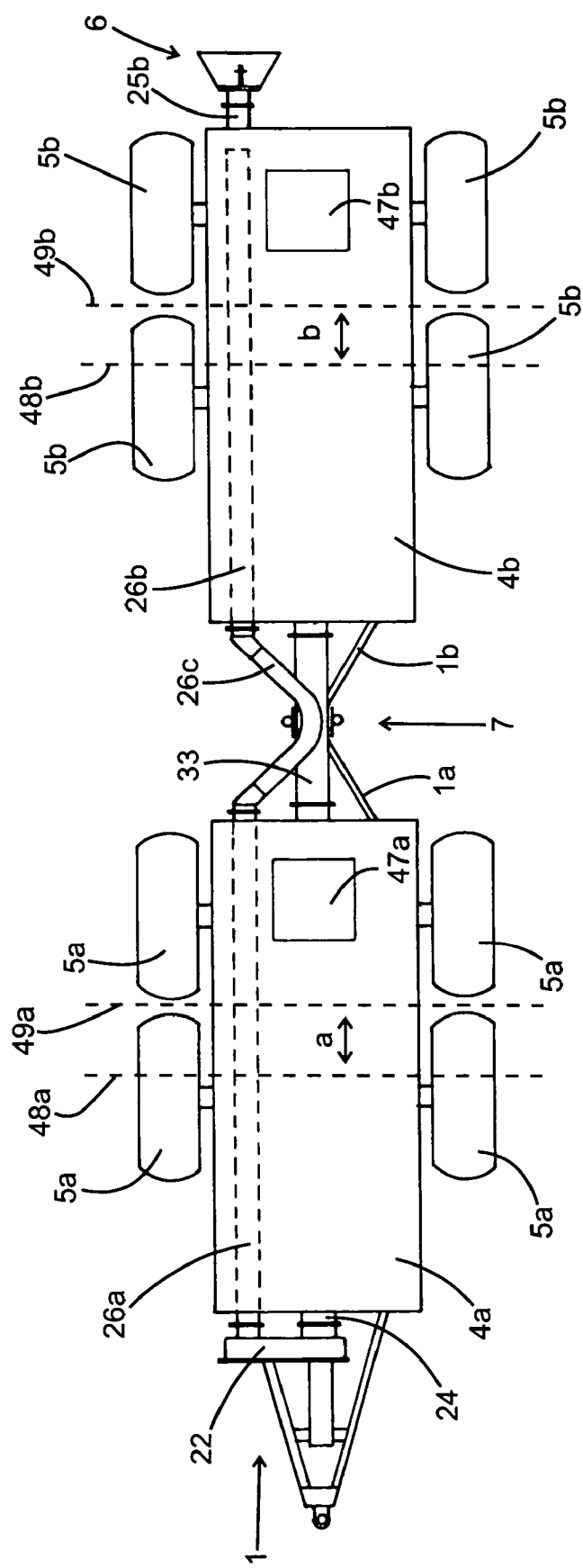
FIG. 7 is a top view of the liquid manure spreader of FIG. 1.
Figure 8:
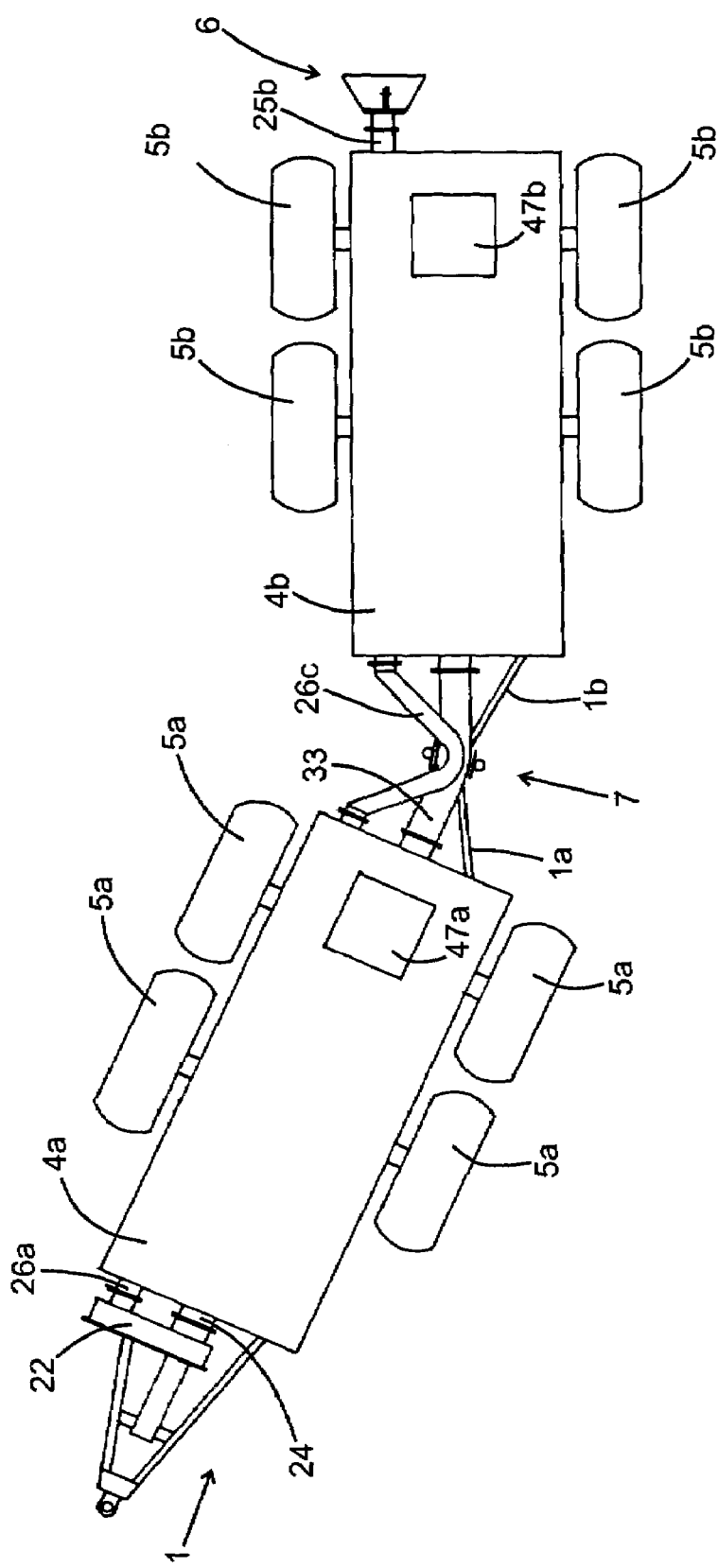
FIG. 8 is a top view of the liquid manure spreader of FIG. 1 during a directional change of the spreader.

Referring to FIGS. 7 and 8, two spaced apart liquid manure tanks 4*a*, 4*b* are each mounted on respective frame portions 1*a*, 1*b*, the frame portions 1*a*, 1*b* having an articulation means 7 therebetween. A front set of axles comprising four front wheels 5*a* mounted on two axles (not shown) and a rear set of axles comprising four rear wheels 5*b* mounted on two axles (not shown) permit movement of the liquid manure spreader. The center of the front and rear tanks 4*a* and 4*b* is forward of the center of the front and rear sets of axles, causing forward weight transfer. Referring specifically to FIG. 7, the center of the front and rear tanks is indicated schematically by 48*a* and 48*b*, respectively, while the center of the front and rear sets of axles is indicated schematically as 49*a* and 49*b*, respectively. The distance between 48*a* and 49*a* is indicated schematically as a, while the distance between 48*b* and 49*b* is indicated schematically as b. As can be seen from the figure, a is greater than b. This causes weight to be transferred forward from the rear frame portion 1*b* to the front frame portion 1*a* and from the front frame portion 1*a* on to the towing vehicle (not shown) via the hitch means.

An opening 47*a*, 47*b* is provided in the top of each tank. A spreader pump 22 is provided at the front end of the frame 1 and a spreader means 6 is provided at the rear end of the frame 1. The inlet of the spreader pump 22 is in fluid communication with the front tank 4*a* through inlet conduit 24. The front tank 4*a* is in fluid communication with the rear tank 4*b* via transition conduit 33. Liquid manure flows through the transition conduit 33 in response to level differences between the tanks during filling or emptying of the tanks. The outlet of the spreader pump is in fluid communication with a re-circulation conduit, which passes through the interior of the tanks and an outlet conduit that is partially obscured by the re-circulation conduit located above. Rear outlet conduit 25*b* can be partly seen projecting from the rear of the frame and is connected to the spreader means 6. Front re-circulation conduit 26*a* passes through the front tank 4*a*, rear re-circulation conduit 26*b* passes through the rear tank 4*b* and intermediate conduit 26*c* connects the front and rear re-circulation conduits. The front and rear re-circulation conduits include apertures (not shown) within the tanks for promoting mixing and agitation of the liquid manure.

Referring specifically to FIG. 8, during a turn the front and rear frame portions 1*a*, 1*b* move relative to one another about the articulation means 7. This allows the rear frame portion 1*b* to substantially follow the front frame portion 1*a* through a turn, obviating the need for a steering system for the axles.

In another embodiment (not shown), the transition conduit 33 extends through the interior of the front tank for direct connection to the inlet of the spreader pump. The transition conduit 33 includes a T-fitting with a first opening in fluid communication with the interior of the front tank 4*a*. A first valve means is provided for controlling the amount of flow through the first opening. The transition conduit includes a second opening in fluid communication with the interior of rear tank 4*b*. A second valve means is provided for controlling the amount of flow through the second opening. By adjusting the first and second valve means, the level in either the front tank or the rear tank may be selectively reduced as the tanks are emptied in order to achieve a pre-determined weight distribution. Optionally, a third valve means may be provided between the front re-circulation conduit 26*a* and the intermediate re-circulation conduit 26*c* and used to control the amount of fluid re-circulated to the front or rear tank 4*a*, 4*b* in order to more rapidly attain the pre-determined weight distribution by pumping liquid manure into the desired tank. The operation of the valves may be controlled manually or automatically according to criteria set by the operator.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having described the invention, what is claimed is:

1. A liquid manure spreader comprising:
   a) a frame having a front end and a rear end, the front end having hitch means for connection to a towing vehicle, the rear end having spreader means for spreading liquid manure;
   b) two or more spaced apart tanks, each tank mounted on to a respective frame portion of the frame, the tanks in fluid communication with one another through one or more fluid conduits;
   c) a set of axles mounted beneath each frame portion having wheels mounted thereto on opposite sides of the frame; and,
   d) the frame having articulation means located between each frame portion permitting relative movement of each frame portion in response to directional changes of the liquid manure spreader.

2. The liquid manure spreader of claim 1, wherein the articulation means has a vertical pivot axis passing therethrough and wherein the articulation means permits relative pivoting movement of each frame portion about the vertical pivot axis.

3. The liquid manure spreader of claim 2, wherein adjacent frame portions pivot in opposite directions about the vertical pivot axis in response to directional changes of the liquid manure spreader.

4. The liquid manure spreader of claim 2, wherein the articulation means limits translational movement of the vertical pivot axis relative to the frame.

5. The liquid manure spreader of claim 1, wherein the articulation means comprises a pintle hitch.

6. The liquid manure spreader of claim 1, wherein the liquid manure is selectively transferred from a certain tank to achieve a pre-determined weight distribution.

7. The liquid manure spreader of claim 6, wherein the liquid manure is selectively transferred to another of the tanks to achieve the pre-determined weight distribution.

8. The liquid manure spreader of claim 1, wherein the center of each tank is mounted to its respective frame portion forward of the center of the set of axles.

9. The liquid manure spreader of claim 1, wherein the spreader comprises front and rear tanks, front and rear frame portions, a first set of axles mounted beneath the front frame portion rearward of the center of the front tank by a first distance, a second set of axles mounted beneath the rear frame portion rearward of the center of the rear tank by a second distance, the first distance greater than the second distance.

10. The liquid manure spreader of claim 1, wherein each tank has a fluid capacity of between 3,000 and 8,000 gallons.

11. The liquid manure spreader of claim 1, wherein each tank is in fluid communication with an adjacent tank through two fluid conduits.

12. The liquid manure spreader of claim 11, wherein the liquid manure is re-circulated between the tanks through one of the fluid conduits.

13. The liquid manure spreader of claim 1, wherein the liquid manure spreader comprises one or more pumps in fluid communication with one or more fluid conduits.

14. The liquid manure spreader of claim 13, wherein the liquid manure is re-circulated between the tanks using the pump.

15. A system for spreading liquid manure comprising:
a) a liquid manure spreader comprising: a frame having a front end and a rear end, the front end having hitch means for connection to a towing vehicle, the rear end having spreader means for spreading liquid manure; two or more spaced apart tanks mounted to the frame and in fluid communication with one another through one or more fluid conduits; at least two sets of axles mounted beneath the frame having wheels mounted thereto on opposite sides of the frame; one or more pumps in fluid communication with the one or more fluid conduits; and,
b) selectively transferring liquid manure from a certain tank to achieve a pre-determined weight distribution between the tanks.

16. The system of claim 15, wherein the weight distribution is pre-determined based on the total weight of the spreader, the angle with respect to horizontal, the available traction of the towing vehicle, or a combination thereof.

17. The system of claim 15, wherein the liquid manure is transferred from one tank to another of the tanks automatically according to pre-determined criteria.

18. The system of claim 15, wherein the liquid manure is selectively transferred to another of the tanks to achieve the pre-determined weight distribution.

* * * * *